Figure 3:
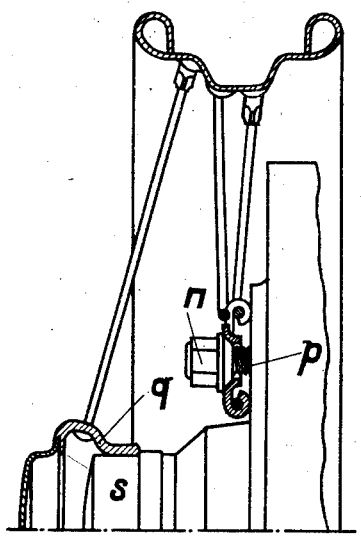

Dec. 15, 1931.  F. HERING  1,837,124
WIRE SPOKE WHEEL
Filed April 6, 1929  2 Sheets-Sheet 1
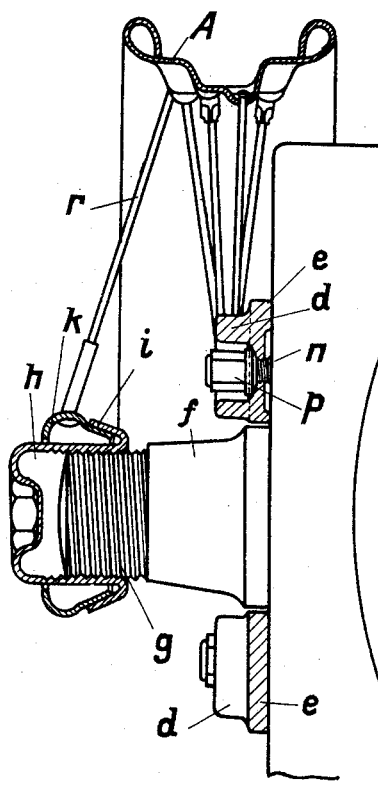
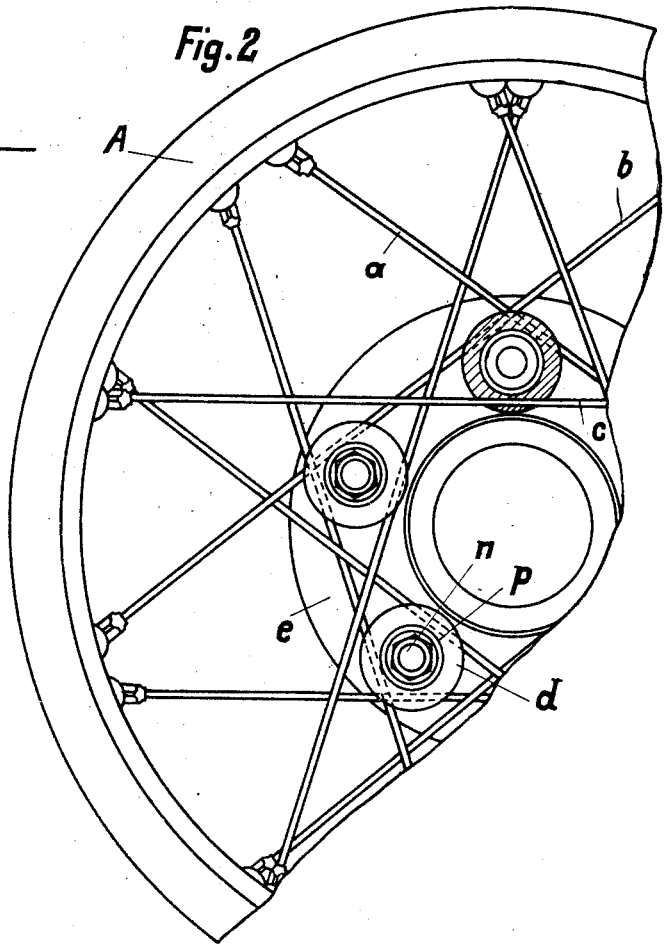
Inventor:
FRITZ HERING Dec. 15, 1931.   F. HERING   1,837,124
WIRE SPOKE WHEEL
Filed April 6, 1929   2 Sheets-Sheet 2

Inventor:
FRITZ HERING

Patented Dec. 15, 1931

1,837,124

UNITED STATES PATENT OFFICE

FRITZ HERING, OF RONNEBURG, GERMANY

WIRE-SPOKE WHEEL

Application filed April 6, 1929, Serial No. 353,098, and in Germany February 9, 1929.

My present invention relates to wire-spoke wheels of the kind in which the wheel hub is maintained within the wheel rim by means of spokes running radially or tangentially thereto. The stability of the wheel depends on the fact that the wheel hub is suspended by the spokes which are individually subjected only to tensile stress. When any load in a given direction is applied to the wheel hub only those spokes extending from the hub in the opposite direction to that of the load will primarily support the load. The foregoing remarks are applicable also to wire wheels of the kind in which the hub does not consist of a single member but in which the spoke-sets are tensioned between the wheel rim and loose hub rings which are adjusted relatively to each other so as to form a rigid hub when the wheel is being assembled on an axle.

The present invention differs from the aforesaid arrangement and, in particular, it secures the advantage of ensuring that every spoke of a set shall take its share of every stress applied to the wheel. By this means greater flexibility is ensured, both towards radial stresses as well as towards stresses directed along the periphery of the wheel (when a vehicle starts, for instance, or when it is abruptly braked.)

According to my present invention a spoke-set (or each spoke-set) is built up of spokes tensioned between different parts of the wheel rim, and such a set is connected to a part of the hub or axle, for instance, by means of a radial flange, or by driving abutments engaging with the spokes where they cross one another. The tightening up of the several spoke-sets of such a wheel can then be effected, in known manner, by axially increasing the distance between the axle or hub sections which are connected to the different spoke-sets.

With such a method of tensioning the spokes, every member of the set so arranged takes up part of every force transmitted from the axle to the wheel rim, without any spoke escaping its share.

Examples of practical constructional forms according to my invention are shown in the drawings, in which:—

Figure 4:
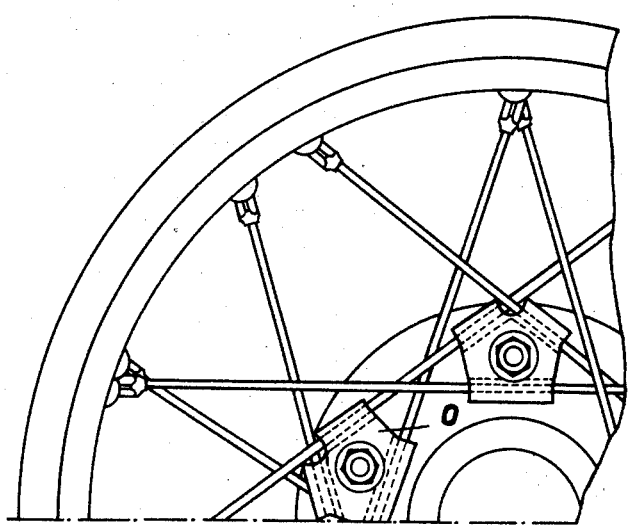

Fig. 1 represents an axial cross-section and
Fig. 2 a side view of one arrangement of wire wheel; while
Figs. 3 and 4 are similar representations illustrating the manner in which the individual drivers of the wire-spoke system are separately screwed to an axle-flange. In Figures 2 and 4 only the inner sets of spokes arranged according to my present invention are shown; the outer sets of spokes being omitted for the sake of clearness.

As shown in Fig. 2, each spoke extends between different parts of the rim A and may be provided at one end with a rivet-head while the other end is threaded. In the example shown three spokes $a$, $b$ and $c$ intercross near each driver abutment $d$, and are arranged relatively to each other so as to leave, for example, a triangular space between them. The driver abutment $d$ on either the axle or boss flange $e$ engages with the three intercrossing spokes simultaneously, and its fixing bolt $n$ and nut $p$ are fitted substantially within said triangular space. The flange $e$ forms, in known manner, part of a hub or axle-box housing $f$, having a threaded end $g$, on which is screwed a nut $h$ provided with a cone member $i$. This cone member $i$ engages the counter conical surface on the outer spoke-ring $k$, which carries the spoke-set $r$ which absorbs certain stresses on the wheel, mainly lateral ones, which may arise, for instance, when curves are being negotiated. This outer spoke-system $r$ (which plays only a subordinate part in transmitting force between the hub and the rim) may consist of spokes tensioned radially or tangentially, or alternatively, it may be tensioned according to the present invention, by the provision of appropriate driver-abutments for the purpose on the outer extremity of the axle or the boss similar to those on the inner extremity.

The spoke-sets may, it should be noted, be connected to the hub or axle at the points where only two spokes cross, instead of where three spokes cross as illustrated.

The several driver abutments $d$ are provided with through-passages (compare the top driver in Fig. 2, shown in section for the purpose) through which the spokes a, b, and c, are passed prior to being tensioned.

Since all spokes are stressed with every transmission of force from the axle or boss to the rim, the number of spokes necessary for providing a stable wheel, adapted according to the invention, may be considerably reduced.

In the constructional form shown in Fig. 1, the tensioning of both spoke-sets, which are connected to different parts of the axle or hub, is effected by the axial displacement of the spoke-ring k further from the spoke-flange e by means of the nut-cap h and cone member i which engages with a similar conical surface on spoke-ring k. In the constructional form shown in Figs. 3 and 4, the several drivers o are of cloth construction and each is independently secured to a flange-shaped part of the axle, such as, for instance, the wall of a brake-drum extending at right-angles to the axle, by means of the nut n and bolt p. The several drivers are adjusted to their final tensioned positions in succession. The front spoke-ring q bears against a shoulder s on the axle so that, as the several drivers o are tightened up, the wheel gradually acquires the all round tension necessary for running security.

What I claim as my invention and desire to secure by Letters Patent of the United States is:—

1. A wire-spoke wheel, comprising, in combination, a rim, inner and outer sets of spokes, hub member parts adapted to engage said outer and said inner sets of spokes, at least one of said sets of spokes consisting of crossing spokes stretched between different parts of said rim and a plurality of driving means cooperating with said spokes adjacent said crossing points to secure the spokes to one of said hub member parts, each of the driving means co-operating with a plurality of spokes.

2. A wire-spoke wheel, comprising, in combination, a rim, inner and outer sets of spokes, hub member parts adapted to engage said outer and said inner sets of spokes, at least one of said sets of spokes consisting of crossing spokes stretched between different parts of said rim, the crossing spokes being arranged in groups of three and providing a triangular space defined by their crossing points, and means secured to one of said hub member parts and arranged in said triangular space for engaging each of the spokes of said group.

3. A wire-spoke wheel, comprising, in combination, a rim, inner and outer sets of spokes, a hub member part adapted to engage said outer set of spokes, at least one of said sets of spokes consisting of crossing spokes stretched between different parts of said rim and members carried by one of said hub member parts and each directly engaging a plurality of spokes adjacent and within their points of crossing for driving the points of connection between the hub member parts and the spokes without interfering with the spoke adjustment.

4. A wire-spoke wheel, comprising, in combination, a rim, inner and outer sets of spokes, a hub member part adapted to engage said outer sets of spokes, a set of drivers adapted to engage said inner set of spokes, at least one of said sets of spokes consisting of spokes stretched between different parts of said rim, said last named spokes being arranged in groups of three intercrossing spokes forming a triangular space for receiving one of said drivers, each driver engaging said three spokes on different sides of the triangular space.

5. A wire-spoke wheel, comprising, in combination, a rim, inner and outer sets of spokes, a hub member part adapted to engage said outer set of spokes, at least one of said sets of spokes consisting of crossing spokes stretched between different parts of said rim, and a driver cooperating with each of a certain group of crossing spokes, said driver engaging each of the spokes of said group adjacent their points of crossing and being removably secured in the wheel structure.

6. A wire-spoke wheel, comprising, in combination, a rim, inner and outer sets of spokes, a hub member part adapted to engage said outer set of spokes, a set of drivers adapted to engage said inner set of spokes, at least one of said set of spokes consisting of spokes stretched between different parts of said rim, said last named spokes being arranged in groups of three intercrossing spokes forming a triangular space for receiving one of said drivers, each of said drivers being shaped of sheet metal and adapted to engage in claw-like manner said three spokes on different sides of the triangular space, and each of said drivers being further adapted to be independently screwed to a holding flange.

In testimony whereof I affix my signature.

FRITZ HERING.